Sept. 30, 1930.  J. GLUCK  1,776,998
ILLUMINATING MEANS FOR TAXIMETERS
Filed Dec. 2, 1922   2 Sheets-Sheet 1
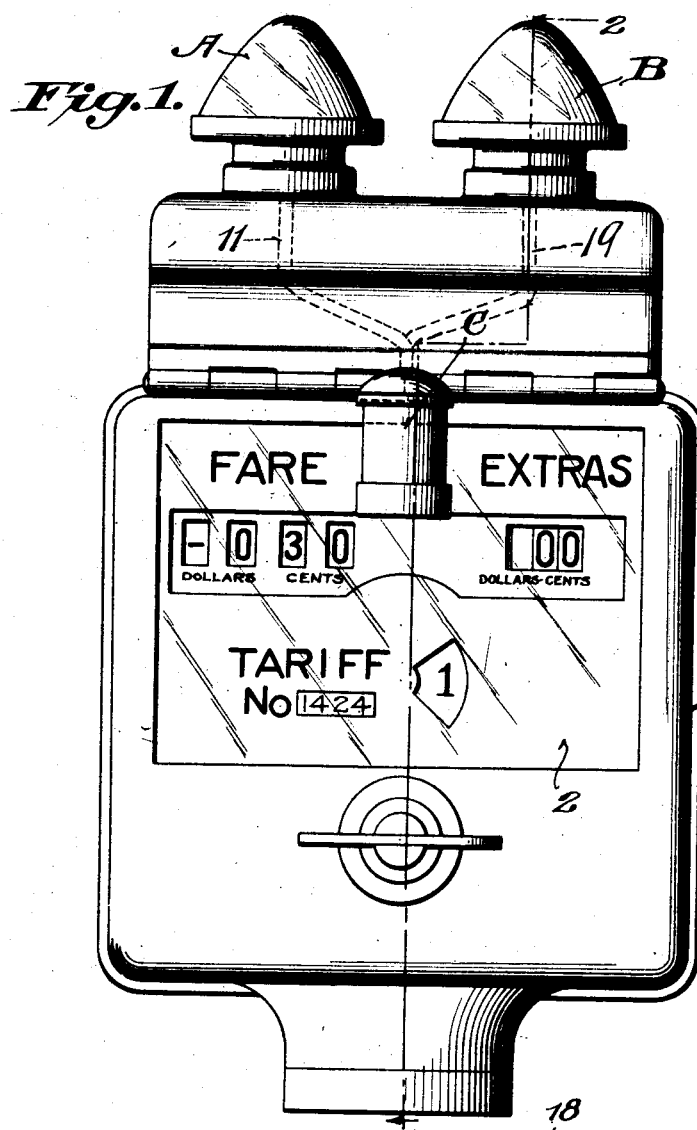
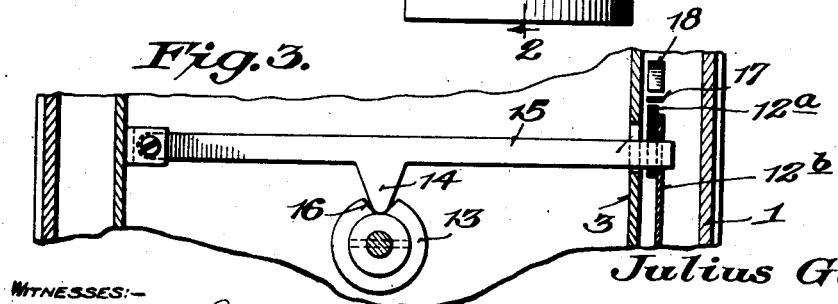

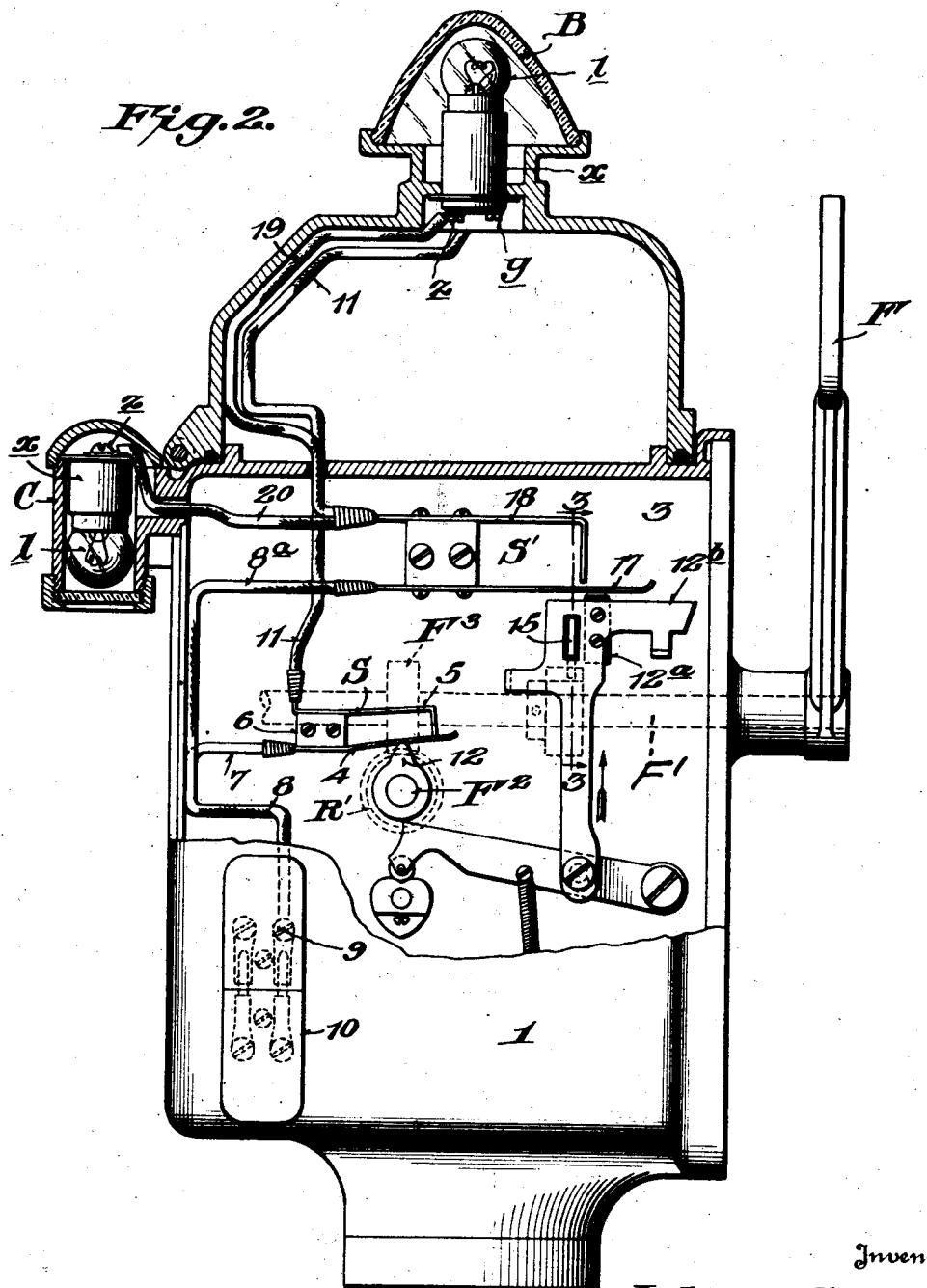

Patented Sept. 30, 1930

1,776,998

UNITED STATES PATENT OFFICE

JULIUS GLUCK, OF NEW YORK, N. Y., ASSIGNOR, BY MESNE ASSIGNMENTS, TO OHMER FARE REGISTER COMPANY, OF DAYTON, OHIO, A CORPORATION OF NEW YORK

ILLUMINATING MEANS FOR TAXIMETERS

Application filed December 2, 1922. Serial No. 604,597.

This invention relates to a novel lighting system for taximeters whereby the fare register may be flooded with light when the meter is operating and also the status of the vehicle will be indicated more especially at night when the usual flag or its equivalent is not readily discernible.

To that end the invention contemplates a novel, attractive and practical arrangement of signal and illuminating lamps which are automatically operated by the flag or the like when the same is moved by the chauffeur to place the meter in or out of operation. In that connection the invention proposes to provide a signal which is illuminated when the flag is in the "for hire" position, thereby not only to announce to the public that the vehicle is "for hire" but to serve as a check on the operator running with his flag up and the meter not registering.

A further object of the invention is to provide simple and reliable means for automatically closing and opening the circuits to the lamps at the proper points in the cycle of the flag.

With the above and other objects in view which will more readily appear as the nature of the invention is better understood, the same consists in the novel construction, combination and arrangement of parts hereinafter more fully described, illlustrated and claimed.

A preferred and practical embodiment of the invention is shown in the accompanying drawings, in which:

Figure 1 is a front view of a meter having the lamps arranged according to the present invention.

Figure 2 is a vertical sectional view taken on the line 2—2 of Fig. 1, illustrating the arrangement of the switches and circuit connections.

Figure 3 is a detail vertical sectional view taken on the line 3—3 of Figure 2.

Similar reference characters designate corresponding parts throughout the several figures of the drawings.

One of the distinctive features of the invention is to provide a combined signal and illuminating system for taximeters which automatically operates at the proper points of the cycle of the flag and flag shaft to indicate that the vehicle is vacant or engaged; and when the vehicle is being used, to also flood the fare register of the meter with light so that the occupant of the cab may readily see the fare totals and other data provided for his inspection and information on the face of the meter.

Obviously, the present lighting system may be used on any type of meter to indicate its condition according to the position of the flag, but for purposes of illustration one embodiment is shown in the accompanying drawings wherein the improved system is applied to a meter of the type shown and described in my co-pending application Serial No. 515,920, filed November 17, 1921.

Accordingly, as will be observed from the drawings, the present invention may be applied to a meter having an exterior casing 1 provided with the window 2 for exhibiting the registering face of the meter mechanism which includes the fare totals and other data. At any suitable and convenient place on the casing 1 of the meter as for example on the top thereof, as shown in Figure 1, are arranged the signal units A and B, while on the front of the meter, preferably in the position also shown in Figure 2, above the window 2, there is also arranged an illuminating unit designated generaly as C.

The signal lamp units A and B may have globes or shades of different colors while the illuminating unit C is intended to flood the fare register box with illuminating light to render the fare totals and other data readily readable.

The signal unit A is preferably used to indicate that the vehicle is "for hire" and is illuminated when the flag F of the meter is in its upright or "for hire" position while the lamp B is preferably included in circuit with the illuminating unit C for flooding the register box of the meter with light so that when the flag F is turned into one of the tariff positions when the vehicle is hired, the signal unit B and illuminating unit C will both be lighted to indicate that the vehicle is hired and also enable the occupant of the vehicle to see the figures on the fare wheels without difficulty.

It will of course be understood that any suitable and convenient form of switch may be used to close the circuit to the signal unit A and the illuminating units B and C but a simple and practical type of switch is shown in the drawings, the switch for operating the unit A being designated generally as S and the switch for operating the signal and illuminating units B and C being designated generally as S'. These switches may be conveniently mounted on one of the side frames 3 of the meter mechanism as shown in Figure 2 and both are controlled by the movement of parts of the meter mechanism operated directly by the flag shaft F' which extends into the meter and operates the cross shaft or cam shaft F² through the medium of the gears R' and F³ as shown in Figure 2.

The units A, B and C each include a suitable metallic socket $x$ which receives an illuminating lamp $l$, one of the terminals $y$ of the socket being grounded to the frame of the meter while the other terminal $z$ is connected with one of the current carrying wires of the electrical circuit.

Referring first to the signal unit A which announces that the meter is in its "for hire" condition, that is with the flag up as shown in Figure 2, it will be observed that the switch S which controls the unit A preferably consists of the contact fingers 4 and 5 carried by a terminal block 6 and having the line wire 7 connecting with the wire 8 leading from the main terminal block 9 to which current is supplied from a battery or other suitable source through the attachment of one of the feed wires with the terminal element 10. The other wire 11 connected with the switch block 6 is in electrical contact with the switch member 5 and leads directly to the terminal $z$ of the lamp of the unit A as shown in Figure 1. When the flag F is in its vertical or "for hire" position the members 4 and 5 of the switch S are maintained in engagement by an insulated cam 12 preferably carried by the cross shaft or cam shaft F² so that when the flag F is in vertical or "for hire" position the unit A is continuously illuminated, but when the flag is moved away from its vertical or "for hire" position thus turning the flag shaft F' and cross shaft F² the cam 12 will move and permit the contact 4 and 5 to separate thus breaking the circuit to the lamp of the said signal unit A.

Simultaneously with the breaking of the circuit to the signal unit A by the opening of the switch S, the member 13 of the flag shaft operated instrumentalities which set the meter in operation, operates the switch S' thereby to close the circuit to the lamps of the signal unit B and illuminating unit C. That is to say, when the flag F is moved into one of the tariff positions the flag shaft F' will turn and rotate the cam 13 to thereby lift the depending finger 14 of the lever 15 out of the notch 16 and consequently lift the member 12ᵇ in the direction of the arrow shown in Figure 2, thereby causing the insulated block 12ᵃ to place the contact 17 into engagement with the contact 18 of the switch S'. As the member 17 is connected with the source of electrical energy through the wire 8ᵃ and the member 18 is connected with the terminal $z$ of the lamp socket in the signal unit B and illuminating unit C by the wires 19 and 20 respectively, the lamp $l$ of the units B and C will be lighted when the members of the switch S' are closed to thus show that the vehicle is engaged and to also flood the fare register with light.

From the foregoing it will be seen that the distinctive feature of the present invention is to provide means for indicating the condition of the meter and illuminating the fare register, the lamps of the illuminating units being lighted or extinguished through the switches S or S' controlled directly by the movement of the flag shaft, or an equivalent member, for setting the meter mechanism in and out of operation. The signal units A and B and illuminating unit C may be of any desired construction and may show any desired color to announce the status of the meter.

Without further description it is thought that the features and advantages of the improvement will be readily apparent to those skilled in the art and it will of course be understood that changes in the form, proportion and minor details of construction, may be resorted to without departing from the spirit of the invention or scope of the appended claims.

I claim:—

1. A combined status-indicating signal and fare drum position illuminating system for taximeters including in combination with the meter casing, a rotatable flag shaft and a cam shaft arranged within and housed and concealed by the meter casing, signal lamps mounted on the meter casing, an illuminating lamp positioned to flood the fare drum with light, a switch operated by said cam shaft, and another switch operated by said flag shaft, said switches being alternately opened and closed to control the signal and illuminating lamps.

2. A signal construction for taximeters comprising a meter casing provided thereon with a plurality of electrical signals, a flag shaft within said casing, a cam rigidly mounted on said flag shaft, a switch, means whereby said switch is closed by said cam when the flag is in hired position, a second switch within said casing, and a second cam to close said second switch when the flag is in for hire position, the first of said switches being connected to leads to light a plurality of said signals so as to flood the face of the meter with light and also to illuminate a distinctively colored light, the second of said switches being connected to another of said signals having a distinguishing color.

3. A combined status indicating signal and fare drum illuminating system for taximeters including a taximeter casing having a plurality of signals mounted on the top thereof, said signals being of a distinctive color, an illuminating unit mounted in such a position as to flood the fare drums with light when illuminated, a flag shaft, a flag mounted thereon, a switch operatively connected with said illuminating unit and one of said signals, a cam on said flag shaft, a lever mounted adjacent said cam so as to be operated thereby, said lever serving as a means to close said switch when the flag is in hired position, a cam shaft operatively connected with said flag shaft, a cam mounted thereon, a second switch, said last named cam serving as a means to close said second switch, and means operatively connecting said second switch with one of said signals.

4. In combination a meter casing provided with two signal lamps and with an illuminating lamp adapted to flood the face of the meter with light, a plurality of electric circuits within the casing, a switch for each of said circuits, one of said circuits extending to one of the signal lamps and the other of said circuits leading to the other signal lamp and the illuminating lamp and means within the taximeter casing whereby either of said switches may be opened or closed, said means including a cam operated by the flag shaft to close one of the switches when the flag shaft is in vacant position so as to cause one of the signal lamps to be illuminated to show that the taxicab is vacant, and a cam adapted to close the other of said switches when the flag shaft is in hired position so as to close the circuit leading to the other signal lamp and to the illuminating lamp.

In testimony whereof I hereunto affix my signature.

JULIUS GLUCK.